United States Patent [19]
Maus et al.

[11] Patent Number: 6,095,406
[45] Date of Patent: Aug. 1, 2000

[54] PROCESS FOR THE PRODUCTION OF A HONEYCOMB BODY FROM TWO DIFFERENTLY CONSTRUCTED KINDS OF SHEET METAL LAYERS

[75] Inventors: Wolfgang Maus, Bergisch Gladbach; Ludwig Wieres, Overath, both of Germany

[73] Assignee: EMITEC Gesellschaft fuer Emissionstechnogie mbH, Lohmar, Germany

[21] Appl. No.: 09/028,231

[22] Filed: Feb. 23, 1998

Related U.S. Application Data

[63] Continuation of application No. PCT/EP96/03674, Aug. 21, 1996.

[30] Foreign Application Priority Data

Aug. 22, 1995 [DE] Germany .......................... 195 30 853

[51] Int. Cl.$^7$ .......................... B23K 20/00; B23K 101/02
[52] U.S. Cl. .......................... 228/181; 228/190; 228/194
[58] Field of Search .......................... 228/181, 190, 228/193, 194; 29/890; 428/116; 502/527.22, 439

[56] References Cited

U.S. PATENT DOCUMENTS

| | | | |
|---|---|---|---|
| 4,838,067 | 6/1989 | Cornelison | 72/196 |
| 5,346,675 | 9/1994 | Usui et al. | 422/180 |
| 5,366,139 | 11/1994 | Jha et al. | |
| 5,447,698 | 9/1995 | Jha et al. | 422/180 |

FOREIGN PATENT DOCUMENTS

| | | |
|---|---|---|
| 0 159 468 B1 | 4/1989 | European Pat. Off. . |
| 0 348 576 A2 | 1/1990 | European Pat. Off. . |
| 0 392 203 A1 | 10/1990 | European Pat. Off. . |
| 0 454 712 B1 | 8/1992 | European Pat. Off. . |
| 42 14 340 C2 | 3/1995 | Germany . |

OTHER PUBLICATIONS

International Publication No. WO 89/07488 (Maus et al.), dated Aug. 24, 1989.

*Primary Examiner*—Samuel M. Heinrich
*Attorney, Agent, or Firm*—Herbert L. Lerner; Laurence A. Greenberg

[57] ABSTRACT

A process for the production of a honeycomb body, preferably a catalyst carrier body, from two differently constructed kinds of high temperature corrosion-resistant sheet metal layers which are wound and/or stacked in a layer-wise manner and which at least partially have a structure for forming passages through which a fluid can flow. A portion of the sheet metal layers is formed of a substantially homogenous steel containing at least chromium and aluminum. Another portion of the sheet metal layers has a layered construction with at least a first layer of chromium-containing steel and at least a second layer substantially containing aluminum. The sheet metal layers are connected together by a heat treatment, wherein the sheet metal layers of layered construction are homogenized by diffusion. The use of differently constructed kinds of sheet metal layers provides for a good connection between the sheet metal layers in spite of a possible reduction in volume of the sheet metal layers of layered construction in the heat treatment.

14 Claims, 1 Drawing Sheet

PROCESS FOR THE PRODUCTION OF A HONEYCOMB BODY FROM TWO DIFFERENTLY CONSTRUCTED KINDS OF SHEET METAL LAYERS

CROSS-REFERENCE TO RELATED APPLICATION

This application is a continuation of International Application Serial No. PCT/EP96/03674, filed Aug. 21, 1996, which designated the United States.

BACKGROUND OF THE INVENTION

FIELD OF THE INVENTION

The present invention relates to a process for the production of a honeycomb body from high temperature-resistant sheet metal layers which are wound and/or stacked in a layer-wise manner.

Such honeycomb bodies are used in particular as catalyst carrier bodies for exhaust gas systems of internal combustion engines and are known, for example, from International Publication WO 89/07488, corresponding to U.S. Pat. No. 5,102,743. Honeycomb bodies which are used as exhaust gas catalyst carrier bodies are used with a catalytically active coating for cleaning exhaust gases in motor vehicles and are both mechanically as well as thermally heavily loaded. Besides thermal and mechanical loadings, the honeycomb body is exposed to attacking gas components which are present in the exhaust gas. In particular, a high level of resistance to corrosion with respect to the sheet metal layers is desirable in regard to the durability of such a honeycomb body.

It is already known from European Patent 0 159 468 B1, corresponding to U.S. Pat. No. 4,602,001, that the sheet metal layers which are used are preferably formed of a steel sheet with a high aluminum content. However, such a material gives rise to problems by virtue of the poor rollability of steel with a high proportion of aluminum and because of the costs which are involved in that situation in the production of such a sheet metal layer. U.S. Pat. No. 5,366,139 also deals with that problem. That patent proposes a sheet metal layer to be used for honeycomb bodies, which is formed of an aluminum-plated steel. Such sheet metal layers can be processed inexpensively within certain limits.

SUMMARY OF THE INVENTION

It is accordingly an object of the invention to provide a process for the production of a honeycomb body from two differently constructed kinds of sheet metal layers, which overcomes the hereinafore-mentioned disadvantages of the heretofore-known methods of this general type, which process uses high temperature corrosion-resistant sheet metal layers that are wound and/or stacked in a layer-wise manner and which at least partially have a structure for forming passages through which a fluid can flow and which process is particularly suitable for the production of a honeycomb body using sheet metal layers of a layered configuration.

With the foregoing and other objects in view there is provided, in accordance with the invention, a process for the production of a honeycomb body from high temperature corrosion-resistant sheet metal layers, which comprises forming a portion of sheet metal layers from a substantially homogenous steel containing at least chromium and aluminum; forming another portion of the sheet metal layers with a layered construction having at least a first layer of chromium-containing steel and at least a second layer substantially containing aluminum; winding and/or stacking or layering the two differently constructed portions of the sheet metal layers into layers of a honeycomb body at least partially having a structure for forming passages through which a fluid can flow; and connecting the sheet metal layers together with a heat treatment in which the sheet metal layers of layered construction are homogenized by diffusion.

This process according to the invention in particular affords the possibility of producing honeycomb bodies with sheet metal layers which are of a layered or laminate configuration and which are of a relatively large cross-section. It has been found that, in the production of honeycomb bodies which were only made from sheet metal layers with a layered configuration, it is not always possible to ensure that the sheet metal layers are connected to each other and/or to a casing surrounding the honeycomb body. It was realized that, in the event of a heat treatment applied to the honeycomb body, there is a reduction in the volume of the sheet metal layers of layered configuration. The reduction in the volume of the sheet metal layers is to be attributed to the fact that the aluminum which forms at least an outer layer of a sheet metal layer diffuses into the first layer of chromium-containing steel, during a heat treatment. In the case of the process according to the invention for the production of a honeycomb body, the influence of the reduction in volume of the sheet metal layers of a layered construction is reduced by the honeycomb body being wound and/or layered from two kinds of sheet metal layers of different constructions. It is proposed in accordance with the invention that a portion of the sheet metal layers is formed of a substantially homogenous steel containing at least chromium and aluminum and another portion of the sheet metal layers is of a layered configuration. That also improves the elastic characteristics of the laminated sheet metal layers during the production process.

In accordance with another mode of the invention, the honeycomb body is produced from alternate layers of smooth and corrugated sheet metal layers. In the case of such a honeycomb body, smooth sheet metal layers which are formed of substantially homogenous material and corrugated sheet metal layers which are of a layered construction are preferred. By virtue of that configuration, the major proportion of the material can be formed of the layered material which can be produced at low cost and which can also be corrugated well.

However, in accordance with a further mode of the invention, in regard to certain uses and large diameters, the reverse case, namely producing the smooth sheet metal layers from the layered material, may afford advantages.

In accordance with an added mode of the invention, the sheet metal layers with the layered configuration include three layers, more specifically an inner layer of chromium steel onto which a layer substantially containing aluminum is applied on both sides thereof, preferably by being rolled on.

In accordance with an additional mode of the invention, the adjacent sheet metal layers are connected together by diffusion at their contact locations, particularly in the heat treatment.

In accordance with yet another mode of the invention, besides the possibility of joining the sheet metal layers together by diffusion, the sheet metal layers, prior to or after the winding or layering operation, are provided with brazing material at least in partial regions thereof and are brazed together in a heat treatment step. That produces a honeycomb body which enjoys a high level of mechanical strength.

In accordance with yet a further mode of the invention, in order to ensure that the contact locations between the sheet metal layers do not come open during the heat treatment, the reduction in volume of the sheets of layered configuration is compensated by a resilient spring-back effect with respect to the sheet metal layers. For that purpose, the sheet metal layers are fitted into a tubular casing, provided with a prestressing effect, at or after the winding operation.

In accordance with yet an added mode of the invention, a portion of the sheet metal layers is provided with an additional microstructure. On one hand, the elasticity of the sheet metal layers can be enhanced by virtue of the formation of additional microstructures. On the other hand, the prestressing of the honeycomb body which is necessary to maintain the contact locations intact during the heat treatment, is reduced since the contact locations afforded by the microstructures are of a smaller surface area than otherwise linear contact locations between the sheet metal layers. The microstructures also result in an improvement in the mixing effect in regard to the gas flowing through the honeycomb body. The microstructures are preferably formed in the sheet metal layers prior to the winding or layering operation.

In accordance with yet an additional mode of the invention, the microstructure as such is in the form of a structure extending transversely with respect to the passages, and is known, for example, from European Patent 0 454 712 B1.

In accordance with again another mode of the invention, the microstructure is a structure extending approximately parallel with respect to the passages.

In accordance with a concomitant mode of the invention, the honeycomb body is fitted into a tubular casing, wherein the tubular casing has a layer which is substantially formed of aluminum on its inward side at least in partial regions thereof. A tubular casing of such a structural configuration enjoys the advantage of ensuring that the sheet metal layers which are in contact with the tubular casing can be connected at their contact locations to the tubular casing by diffusion. Furthermore, the tubular casing is more resistant to corrosion, in regard to aggressive exhaust gases.

Other features which are considered as characteristic for the invention are set forth in the appended claims.

Although the invention is illustrated and described herein as embodied in a process for the production of a honeycomb body from two differently constructed kinds of sheet metal layers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
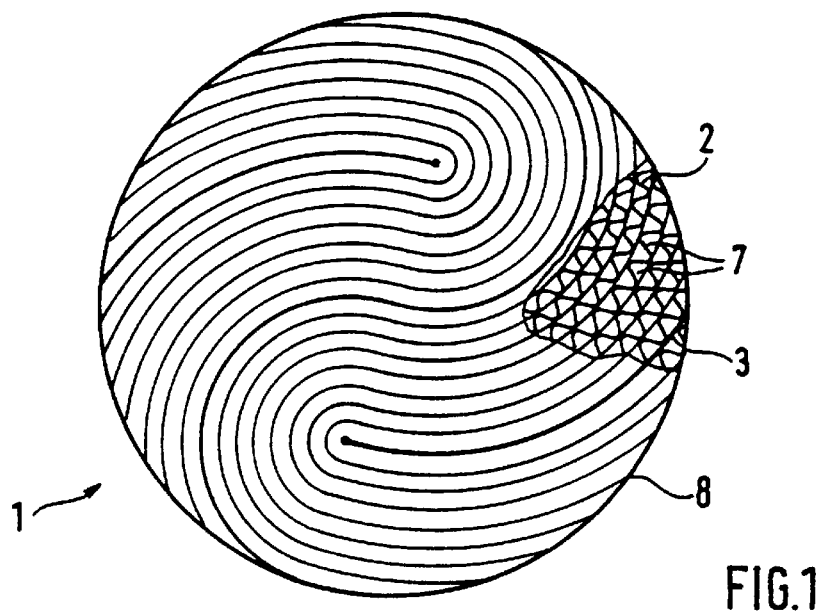
FIG. 1 is a diagrammatic, front-elevational view of a honeycomb body.

Referring now to the figures of the drawings in detail and first, particularly, to FIG. 1 thereof, there is seen a honeycomb body 1. The honeycomb body 1 is formed of high temperature corrosion-resistant sheet metal layers which are wound and layered or stacked in a layer-wise manner. The honeycomb body 1 is produced from alternate layers of smooth and corrugated sheet metal layers 2, 3. The smooth sheet metal layers 2 are formed of substantially homogenous steel containing at least chromium and aluminum. The corrugated sheet metal layers 3 are of a layered or laminate configuration. The corrugated and layered sheet metal layers 3 include an inner layer 4 of chromium steel and layers 5, 6 which essentially contain aluminum and are each applied to a respective side of the inner layer 4, as can be seen from FIG. 2. The honeycomb body 1, which is produced from sheet metal layers that are wound and stacked in a layer-wise manner, has a structure for forming passages 7 through which a fluid can flow. The sheet metal layers are disposed in a tubular casing 8. The tubular casing 8 has an inner surface with a layer which is essentially formed of aluminum, at least in partial regions thereof.

Figure 2:
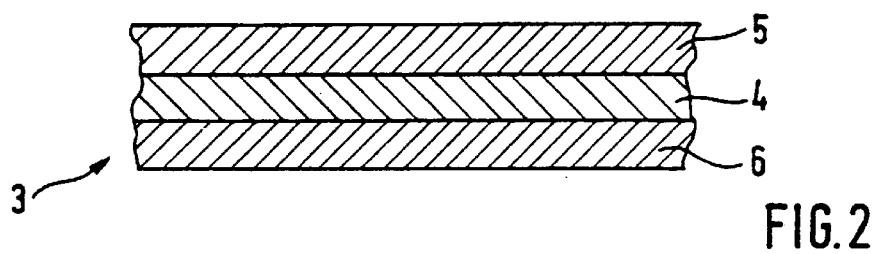
FIG. 2 is an enlarged, fragmentary, sectional view of a sheet metal layer with a layered construction.
Figure 3:
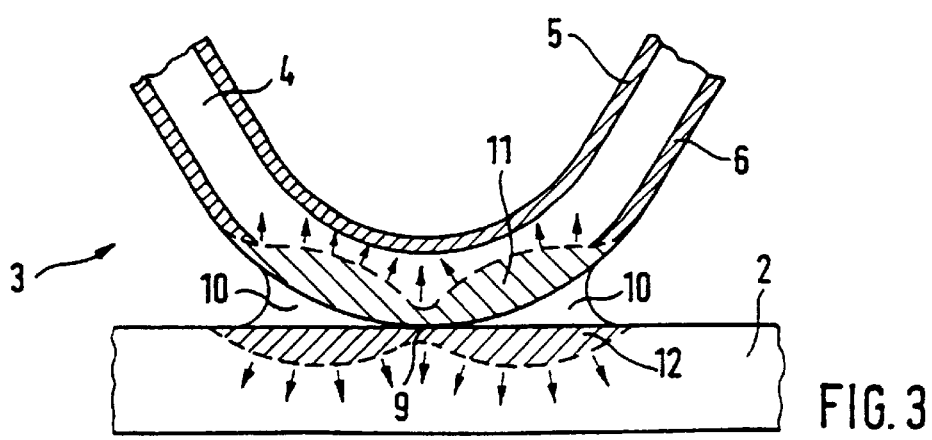
FIG. 3 is a fragmentary, sectional view of a contact location between a sheet metal layer with a layered configuration and a sheet metal layer of a substantially homogenous steel.

FIG. 3 shows a contact location 9 between a smooth sheet metal layer 2 and a corrugated sheet metal layer 3. The corrugated sheet metal layer 3 is of a layered or laminate construction as shown in FIG. 2. During a heat treatment by which the sheet metal layers 2, 3 are at the same time connected together by diffusion at their contact locations, the layer 6 on the inner layer 4 of the corrugated sheet metal layer 3 is melted onto the sheet metal layer 2. The melted-on layer 3 wets the surface of the sheet metal layers, in which case a portion of the aluminum flows into gaps 10 between the corrugated sheet metal layer 3 and the smooth sheet metal layer 2 by virtue of capillary action at the contact location 9. During the heat treatment step, aluminum diffuses into the smooth sheet metal layer 2 and into the inner layer 4 of the corrugated sheet metal layer 3. In that case, zones 11, 12 which have an increased aluminum content are produced. Aluminum-steel alloys have a substantially lower melting point than steel so that the inner layer 4 of the corrugated sheet metal layer 3 and the smooth sheet metal layer 2 are temporarily liquefied in the zones 11, 12 and an intimate connection is produced in the region around the contact location 9, which has virtually the properties of a welded connection. The concentration gradient causes aluminum to go further into the sheet metal layers 2, 3, as is indicated by arrows. There is thus a depletion in terms of the aluminum content in the zones 11, 12 and as a result the melting point of the zones 11, 12 increases so that the connecting location hardens.

Honeycomb bodies according to the invention can be produced inexpensively while being of high quality and in particular also of large diameters of over 90 mm and in particular over 105 mm or even 120 mm.

We claim:

1. A process for the production of a honeycomb body from high temperature corrosion-resistant sheet metal layers, which comprises:

forming a portion of sheet metal layers from a substantially homogenous steel containing at least chromium and aluminum;

forming another portion of the sheet metal layers with a layered construction having at least a first layer of chromium-containing steel and at least a second layer substantially containing aluminum;

at least one of winding and stacking the two differently constructed portions of the sheet metal layers into layers of a honeycomb body at least partially having a structure for forming passages through which a fluid can flow; and connecting the sheet metal layers together with a heat treatment in which the sheet metal layers of layered construction are homogenized by diffusion.

2. The process according to claim 1, which comprises forming smooth sheet metal layers from the portion of the sheet metal layers of substantially homogenous steel, forming corrugated sheet metal layers from the portion of the sheet metal layers with a layered construction, and producing the honeycomb body from alternate layers of the smooth and corrugated sheet metal layers.

3. The process according to claim 1, which comprises forming smooth sheet metal layers from the portion of the sheet metal layers with a layered construction, forming corrugated sheet metal layers from the portion of the sheet metal layers of substantially homogenous steel, and producing the honeycomb body from alternate layers of the smooth and corrugated sheet metal layers.

4. The process according to claim 1, which comprises producing the sheet metal layers of layered construction with an inner layer of chromium steel having two sides and outer layers substantially containing aluminum each applied to a respective one of the sides.

5. The process according to claim 4, which comprises rolling the outer layers onto the sides of the inner layer.

6. The process according to claim 1, which comprises placing brazing material at least at partial regions of the sheet metal layers prior to the at least one of winding and stacking step, and carrying out the heat treatment as a brazing operation.

7. The process according to claim 1, which comprises placing brazing material at least at partial regions of the sheet metal layers after the at least one of winding and stacking step, and carrying out the heat treatment as a brazing operation.

8. The process according to claim 1, which comprises connecting the sheet metal layers together by diffusion at contact locations thereof during the heat treatment.

9. The process according to claim 1, which comprises fitting the sheet metal layers with a prestressing into a tubular casing, in the winding operation, for compensating for a reduction in volume of the sheet metal layers of layered construction in the heat treatment with an elastic spring-back effect of the sheet metal layers and preventing contact locations between the sheet metal layers from opening.

10. The process according to claim 1, which comprises fitting the sheet metal layers with a prestressing into a tubular casing, after the winding operation, for compensating for a reduction in volume of the sheet metal layers of layered construction in the heat treatment with an elastic spring-back effect of the sheet metal layers and preventing contact locations between the sheet metal layers from opening.

11. The process according to claim 1, which comprises providing at least a portion of the sheet metal layers with an additional microstructure prior to the at least one of winding and stacking step.

12. The process according to claim 11, which comprises providing the microstructure as a structure extending transversely relative to the passages.

13. The process according to claim 11, which comprises providing the microstructure as a structure extending approximately parallel to the passages.

14. The process according to claim 1, which comprises fitting the honeycomb body into a tubular casing having an inner surface with a layer substantially formed of aluminum at least in partial regions thereof.

* * * * *